United States Patent
Park et al.

(10) Patent No.: US 12,348,966 B2
(45) Date of Patent: Jul. 1, 2025

(54) METHOD FOR CONTROLLING ACCESS OF TERMINAL TO PRIVATE NETWORK

(71) Applicant: SAMSUNG ELECTRONICS CO., LTD., Suwon-si (KR)

(72) Inventors: Jungshin Park, Suwon-si (KR); Sangjun Moon, Suwon-si (KR); Youngkyo Baek, Suwon-si (KR); Yoonseon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 17/758,396

(22) PCT Filed: Dec. 22, 2020

(86) PCT No.: PCT/KR2020/018840
§ 371 (c)(1),
(2) Date: Jul. 5, 2022

(87) PCT Pub. No.: WO2021/141288
PCT Pub. Date: Jul. 15, 2021

(65) Prior Publication Data
US 2023/0021988 A1    Jan. 26, 2023

(30) Foreign Application Priority Data

Jan. 6, 2020 (KR) .................. 10-2020-0001582

(51) Int. Cl.
*H04W 12/08*    (2021.01)
*H04W 48/08*    (2009.01)
(Continued)

(52) U.S. Cl.
CPC ........... *H04W 12/08* (2013.01); *H04W 48/08* (2013.01); *H04W 48/16* (2013.01); *H04W 60/00* (2013.01)

(58) Field of Classification Search
CPC ..... H04W 12/08; H04W 60/00; H04W 48/08; H04W 48/16; H04W 60/04; H04W 8/04;
(Continued)

(56) References Cited

U.S. PATENT DOCUMENTS 10,798,556 B2    10/2020 Kim et al.
11,800,574 B2 *  10/2023 Kawasaki ............. H04W 60/00
(Continued)

FOREIGN PATENT DOCUMENTS

KR    10-2018-0120609 A    11/2018
KR    10-2020-0114814 A    10/2020
(Continued)

OTHER PUBLICATIONS

European Patent Office, "Supplementary European Search Report," dated May 8, 2023, in connection with European Patent Application No. 20911434.7, 14 pages.
(Continued)

*Primary Examiner* — Hirdepal Singh

(57) ABSTRACT

The present disclosure relates to a communication technique that combines IoT technology with a 5th generation (5G) or pre-5G communication system for supporting a higher data transmission rate than a 4th generation (4G) communication system such as long term evolution (LTE), and to a system therefor. The present disclosure may be applied to intelligent services (for example, smart homes, smart buildings, smart cities, smart cars or connected cars, healthcare, digital education, retail businesses, security and safety-related services, etc.) on the basis of 5G communication technology and IoT-related technology. According to various embodiments of the present invention, a method and apparatus for controlling an access of a terminal in a wireless communication system that provides a private network slice may be provided.

12 Claims, 10 Drawing Sheets

(51) Int. Cl.
*H04W 48/16* (2009.01)
*H04W 60/00* (2009.01)

(58) Field of Classification Search
CPC . H04W 8/186; H04W 12/037; H04W 12/106; H04W 48/10; H04L 2209/80; H04L 63/123; H04L 63/126; H04L 9/0841; H04L 9/0891; H04L 9/3236
USPC .......................................................... 455/411
See application file for complete search history.

(56) References Cited

U.S. PATENT DOCUMENTS

| | | | |
|---|---|---|---|
| 2022/0095260 A1* | 3/2022 | Shan | H04W 60/04 |
| 2022/0201592 A1* | 6/2022 | Lindheimer | H04W 48/10 |
| 2022/0201593 A1 | 6/2022 | Baek et al. | |
| 2022/0322080 A1* | 10/2022 | Hedman | H04W 12/0433 |
| 2022/0353680 A1* | 11/2022 | Hu | H04W 12/069 |

FOREIGN PATENT DOCUMENTS

| | | | |
|---|---|---|---|
| KR | 10-2021-0044104 A | 4/2021 | |
| WO | 2018236819 A1 | 12/2018 | |

OTHER PUBLICATIONS

3GPP TS 23.501 V16.3.0 (Dec. 2019); Technical Specification; 3rd Generation Partnership Project; Technical Specification Group Services and System Aspects; System architecture for the 5G System (5GS); Stage 2 (Release 16); 417 pages.
Samsung, "Discussion on requirement of sending CAG ID by UE," C1-200578, 3GPP TSG WG1 Meeting #122-e, Feb. 2020, 2 pages.
International Search Report and Written Opinion of the International Searching Authority in connection with International Application No. PCT/KR2020/018840 issued Mar. 9, 2021, 7 pages.
InterDigital, Inc., "Mobility Registration triggered by CAG cell change," S2-1903348, 3GPP TSG SA WG2 #132, Xi'an, China, Apr. 8-12, 2019, 3 pages.
InterDigital et al., "Introduction of pending NSSAI for network slice-specific authentication and authorization," C1-199044, 3GPP TSG CT WG1 #121, Reno (NV), USA, Nov. 11-15, 2019, 40 pages.
Samsung, "New solution for CAG ID privacy," S3-192954, 3GPP TSG SA WG3 #96, Wroclaw, Poland, Aug. 26-30, 2019, 3 pages.
Qualcomm Incorporated, "Introduction of NSSAI efficient signalling for IoT devices," C1-196412, 3GPP TSG CT WG1 #120, Portoroz (Slovenia), Oct. 7-11, 2019, 56 pages.
Communication pursuant to Article 94(3) EPC dated Apr. 2, 2025, in connection with European Patent Application No. 20911434.7, 9 pages.
3GPP TS 23.502 V16.3.0 (Dec. 2019) Technical Specification, 3rd Generation Partnership; Technical Specification Group Services and System Aspects; Procedures for the 5G System (5GS); Stage 2 (Release 16), Dec. 2019, 558 pages.
3GPP TS 24.501 V16.3.0 (Dec. 2019), Technical Specification, 3rd Generation Partnership Project; Technical Specification Group Core Network and Terminals; Non-Access-Stratum (NAS) protocol for 5G System (5GS); Stage 3 (Release 16), Dec. 2019, 507 pages.

\* cited by examiner

METHOD FOR CONTROLLING ACCESS OF TERMINAL TO PRIVATE NETWORK

CROSS-REFERENCE TO RELATED APPLICATIONS

This application is a 371 of International Application No. PCT/KR2020/018840, filed Dec. 22, 2020, which claims priority to Korean Patent Application No. 10-2020-0001582, filed Jan. 6, 2020, the disclosures of which are herein incorporated by reference in their entirety.

BACKGROUND

1. Field

The disclosure relates to a method and apparatus for controlling access of a terminal in a wireless communication system that provides private network slices.

2. Description of Related Art

To meet the ever increasing demand for wireless data traffic since the commercialization of 4th generation (4G) communication systems, efforts have been made to develop improved 5th generation (5G) or pre-5G communication systems. As such, 5G or pre-5G communication systems are also called "beyond 4G network system" or "post Long Term Evolution (LTE) system".

To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), interference cancellation, and the like.

Additionally, advanced coding and modulation (ACM) schemes such as hybrid frequency shift keying and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

5G systems are expected to support more various services compared to existing 4G systems. For example, the most representative services may include enhanced mobile broadband (eMBB), ultra-reliable and low-latency communication (URLLC), massive machine type communication (mMTC), and evolved multimedia broadcast/multicast service (eMBMS). Also, a system providing a URLLC service may be referred to as a URLLC system, and a system providing an eMBB service may be referred to as an eMBB system. In addition, the terms "service" and "system" may be used interchangeably.

Among them, the URLLC service is a service newly considered in the 5G system, unlike the existing 4G system, and requires satisfaction of ultra-high reliability (e.g., packet error rate of about 10-5) and very low latency (e.g., about 0.5 msec) conditions compared to other services. To satisfy such strict requirements, the URLLC service may need to utilize a shorter transmission time interval (TTI) than the eMBB service, and various operation methods using this are being considered.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years.

In IoT environments, it is possible to provide intelligent Internet technology services, which collect and analyze data created by interconnected things to add new values to human life. Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 5G technology and IoT technology.

As described above, as various services can be provided along with the advancement of mobile communication systems, there is a need for a technology that provides a private network service by using a wireless communication system.

SUMMARY

The disclosure provides a technology that provides a private network service by utilizing a wireless communication system.

The technical objectives to be achieved in the disclosure are not limited to those mentioned above, and other technical objectives not mentioned will be clearly understood by those of ordinary skill in the art to which the disclosure belongs from the following description.

A method for a private network terminal to control private network access according to an embodiment of the disclosure may include: performing, by the terminal, configuration to make an access attempt to an operator's private network for initial configuration; making, by the terminal, a connection request to a private network for initial configuration; identifying, by the private network, subscription information of the terminal, and determining whether it is necessary to change the initial configuration of the terminal; transmitting, by the private network, initial configuration information to the terminal through a request response message; and storing, by the terminal, the received initial configuration information, and changing the connection to an appropriate private network.

In addition, a method performed by a terminal in a wireless communication system according to an embodiment of the disclosure may comprise: transmitting, to an access and mobility management function (AMF), a registration request message including information indicating an update of private network configuration information, in case that it is required to update the private network configuration information of the terminal; and receiving, from the AMF, a registration accept message including the private network configuration information.

In addition, the information indicating the update of the private network configuration information includes at least one of an indication for closed access group (CAG) update, a CAG identifier (ID) preset for updating the private network configuration information, or information indicating a slice for updating the private network configuration information.

In addition, the transmitting the registration request message comprises: receiving, from the AMF, system information including a list of closed access group (CAG) identifiers (IDs); identifying whether a CAG ID that the terminal is allowed to access is included in the list of the CAG IDs; and transmitting, to the AMF, the registration request message, in case that the CAG ID that the terminal is allowed to access is not included in the list of the CAG IDs.

In addition, the method further comprises: in case that information indicating that additional authentication is required is included in the registration accept message, transmitting, to the AMF, a request message for establishing a protocol data unit (PDU) session; receiving, from the AMF, a response message including information indicating that PDU session establishment is successful; and receiving, from the AMF, a UE configuration update message including the private network configuration information.

In addition, a method performed by an access and mobility management function (AMF) in a wireless communication system according to an embodiment of the disclosure may comprise: receiving, from a terminal, a registration request message including information indicating an update of private network configuration information of the terminal; transmitting, to a user data management (UDM), a registration request message for registering the terminal; receiving, from the UDM, a subscription data profile (SDP) including the private network information of the terminal ; and transmitting, to the terminal, a registration accept message including the private network configuration information.

In addition, the receiving the registration request message comprises: transmitting, to the terminal, system information including a list of closed access group (CAG) identifiers (IDs); and receiving, from the terminal, the registration request message in case that a CAG ID that the terminal is allowed to access is not included in the list of the CAG IDs.

In addition, the method further comprises: in case that information indicating that additional authentication is required is included in the registration accept message, receiving, from the terminal, a request message for establishing a protocol data unit (PDU) session; transmitting, to a session management function (SMF) for updating the private network configuration information of the terminal, the request message for PDU session establishment; receiving, from the SMF, a response message for PDU session establishment in case that authentication with a private network management server is successful; transmitting, to the terminal, a response message including information indicating that PDU session establishment is successful; and transmitting, to the terminal, a UE configuration update message including the private network configuration information.

In addition, a terminal in a wireless communication system according to an embodiment of the disclosure may comprise: a transceiver; and a controller is configured to: transmit, to an access and mobility management function (AMF), a registration request message including information indicating an update of private network configuration information through the transceiver, in case that it is required to update the private network configuration information of the terminal, and receive a registration accept message including the private network configuration information through the transceiver from the AMF.

Further, an AMF in a wireless communication system according to an embodiment of the disclosure may comprise: a transceiver; and a controller configured to: receive, from a terminal via the transceiver, a registration request message including information indicating an update of private network configuration information of the terminal, transmit, to a user data management (UDM) via the transceiver, a registration request message for registering the terminal, receive, from the UDM via the transceiver, a subscription data profile (SDP) including the private network information of the terminal, and transmit, to the terminal via the transceiver, a registration accept message including the private network configuration information.

According to an embodiment of the disclosure, it is possible to provide an apparatus and method that effectively provide a private network service by utilizing a wireless communication network system.

The advantageous effects obtainable in the disclosure are not limited to those mentioned above, and other effects not mentioned may be clearly understood by those of ordinary skill in the art to which the disclosure belongs from the description below.

DETAILED DESCRIPTION

Figure 1:
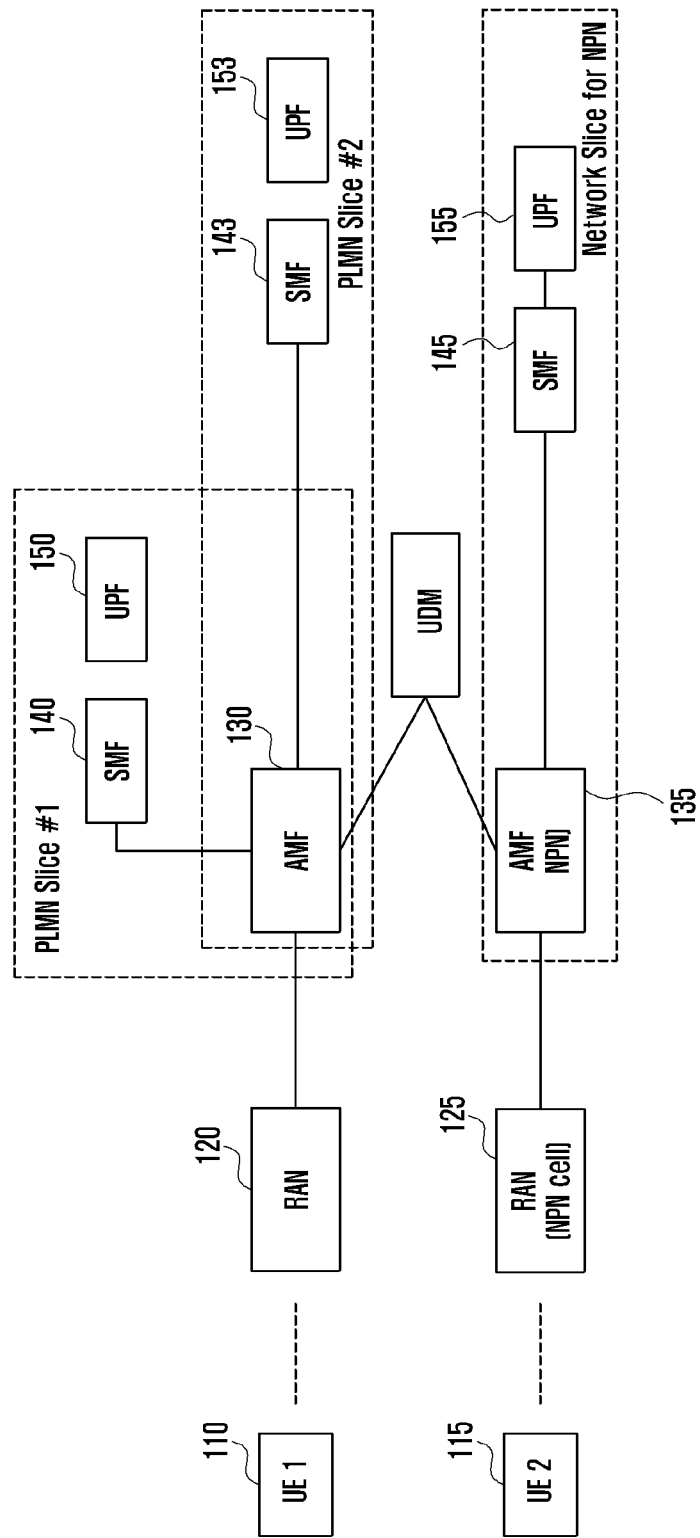
FIG. 1 illustrates an overall architecture for configuring a private network slice in a wireless communication system according to an embodiment of the disclosure.

Hereinafter, the operating principle of the disclosure will be described in detail with reference to the accompanying drawings. In the description of the disclosure, descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

Likewise, in the drawings, some elements are exaggerated, omitted, or only outlined in brief. Also, the size of each element does not necessarily reflect the actual size. The same reference symbols are used throughout the drawings to refer to the same or corresponding parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the specification to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide steps for executing functions described in blocks of the flowchart.

Additionally, each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component such as an FPGA (field programmable gate array) or ASIC (application specific integrated circuit) capable of carrying out a function or an operation. However, "unit" or the like is not limited to hardware or software. A unit or the like may be configured so as to reside in an addressable storage medium or to drive one or more processors. For example, units or the like may refer to components such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Further, components and units may be implemented to drive one or more processors in a device or a secure multimedia card. In addition, a unit or the like may include one or more processors in an embodiment.

In the following description of the disclosure, detailed descriptions of functions and structures well known in the art may be omitted for clarity and conciseness without obscuring the subject matter of the disclosure. Next, embodiments of the disclosure will be described with reference to the accompanying drawings.

Those terms used in the following description for identifying an access node, indicating a network entity, indicating a message, indicating an interface between network entities, and indicating various identification information are taken as illustration for ease of description. Accordingly, the disclosure is not limited by the terms to be described later, and other terms referring to objects having an equivalent technical meaning may be used.

For convenience of description, in the disclosure, terms and names defined in LTE and NR standards, which are the latest standards defined by the 3rd Generation Partnership Project (3GPP) organization among existing communication standards, are used. However, the disclosure is not limited by the above terms and names, and may be equally applied to systems conforming to other standards. In particular, the disclosure can be applied to 3GPP NR (5th generation mobile communication standards). In addition, embodiments of the disclosure may be applied to other communication systems having similar technical backgrounds or channel configurations. Further, it should be understood by those skilled in the art that the embodiments of the disclosure are applicable to other communication systems without significant modifications departing from the scope of the disclosure.

An object of the disclosure is to define, for unmanned aerial service (UAS) provider, a service provision area of a UAS subscriber terminal, and define a method and an apparatus for controlling a terminal not to deviate from the service area. Further, another object of the disclosure is to define a method for a UAS provider to receive status information of a UAS terminal from a mobile communication system and manage the service area of the UAS terminal.

According to an embodiment of the disclosure, based on the determination regarding communication environments and movement paths of a UAS terminal, it is possible to perform proactive control of the UAS terminal through the UAS system before the terminal enters a service restricted zone.

FIG. 1 illustrates an overall architecture for configuring a private network slice in a wireless communication system according to an embodiment of the disclosure.

With reference to FIG. 1, when UEs (UE 1 (110), UE 2 (115)) access the wireless communication network, communication can be carried out through different slices (slice #1, slice #2, slice for non-public network (NPN)) of the wireless communication network according to the type of services subscribed by each UE (UE 1, UE 2).

In FIG. 1, UE 1 (110), which has a subscription to a general mobile communication service of the communication operator, connects to the wireless communication network through a base station 120 and a cell for providing general services in the operator's network, and uses a communication service through a network slice (multiple network slices depending on the embodiment) (slice #1, slice #2) (130, 140, 150, 143, 153) required according to the subscription details of UE 1 (110) via the AMF 130 in the operator's network.

On the other hand, UE 2 (115) having subscribed only to a private network service is restricted from connecting to the wireless communication network through the base station 120 used for general services, and connects to the wireless communication network through a base station 125 and cell allowed to connect to the private network. Then, it uses a communication service through a network slice (e.g., network slice for NPN) (135, 145, 155) required according to the subscription details of UE 2 (115) via the AMF 135 for NPN in the private network.

In order for the UE 115 to determine whether to connect to a private network, the base station 125 providing a connection to the private network may always broadcast a closed access group (CAG) identifier (ID) via a system information block (SIB) of the base station 125. Then, the UE 115 may receive this information and determine whether the corresponding cell is a cell that allows it to access the private network to which it has subscribed.

For the operation of the UE 115 to access a private network, the UE 115 may store in advance configuration information (e.g., CAG ID) about CAGs that can be used for access to a private network to which the UE 115 has subscribed. However, if there is no information pre-configured in the UE 115 due to the initial UE purchase or UE replacement, or if there is no valid CAG configuration information due to the renewal of subscription information, a problem may arise in which network access of the UE 115 becomes impossible. The disclosure proposes a network access method for the UE 115 to update the CAG information in a situation where the UE 115 does not have valid CAG information.

Figure 2:
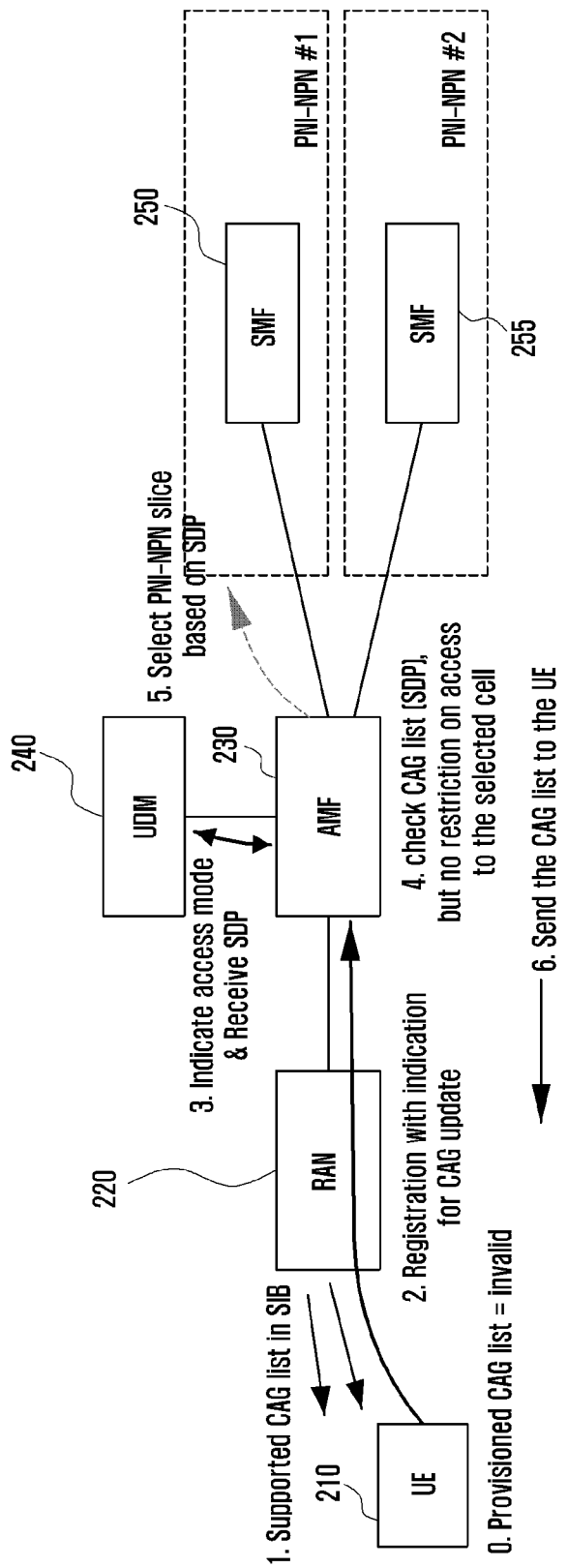
FIG. 2 illustrates overall operations of an private network UE to update configuration information by using a separate indicator according to an embodiment of the disclosure.

FIG. 2 illustrates overall operations of an private network UE to update configuration information by using a separate indicator according to an embodiment of the disclosure.

With reference to FIG. 2, the UE 210 may be in a state in which access to the private network is suspended. For example, although the base station 220 has transmitted CAG IDs through the SIB, there may be no accessible CAG cell matching the CAG list stored in the UE 210, or there may be no valid CAG list in the UE 210. In this case, by the user or an operation of a separate configuration program, the UE 210 may initiate network access to update configuration information for private network connection.

When the UE 210 executes an access procedure for updating private network configuration information, unlike a regular private network access procedure, the UE 210 may not distinguish whether the cell to which the UE 210 wants to access is a cell belonging to the CAG allowed to access the private network to which the UE 210 is subscribed (that is, whether a CAG ID the UE is allowed to access is provided).

Then, the UE 210 may transmit a message for initial registration (e.g., registration request message) including information indicating access for initial configuration, for example, identification information such as "indication for CAG update" to the access and mobility management function (AMF) 230 (via the base station 220). The information indicating access for initial configuration may indicate that the UE 210 is attempting a restricted access, and/or may indicate an access for the UE 210 to request CAG configuration information. In this case, the AMF 230 may not determine whether the cell to which the UE makes an access request is included in the CAG list included in the subscription data profile (SDP) of the UE 210.

The AMF 230 having received the registration request message from the UE 210 may obtain subscription information of the UE 210 from the user data management (UDM) 240 storing subscriber information. Then, the AMF 230 may identify private network configuration information of the UE 210 included in the subscription information to determine whether the private network configuration information of the UE 210 needs to be updated. When it is necessary to update the private network configuration information of the UE 210, the AMF 230 may transmit a registration accept message including a CAG ID list as updated private network configuration information to the UE 210.

According to an embodiment, if the updated configuration information of the UE 210 allows access through the cell to which an access attempt is being made, during a process of handling the initial registration of the UE 210, the AMF 230 may additionally perform a process of configuring network resources so as to permit access to a private network slice (e.g., PIN-NPN (public network integrated-NPN) #1, SMF 250) allowed by the subscription information of the UE 210.

According to an embodiment, if the updated configuration information of the UE 210 does not allow access through the cell to which an access attempt is being made, the UE 210 may use the updated configuration information received from the AMF 230 to search for a new cell supporting the CAG ID to which access is allowed, and perform the initial registration process again through the corresponding cell.

Figure 3:
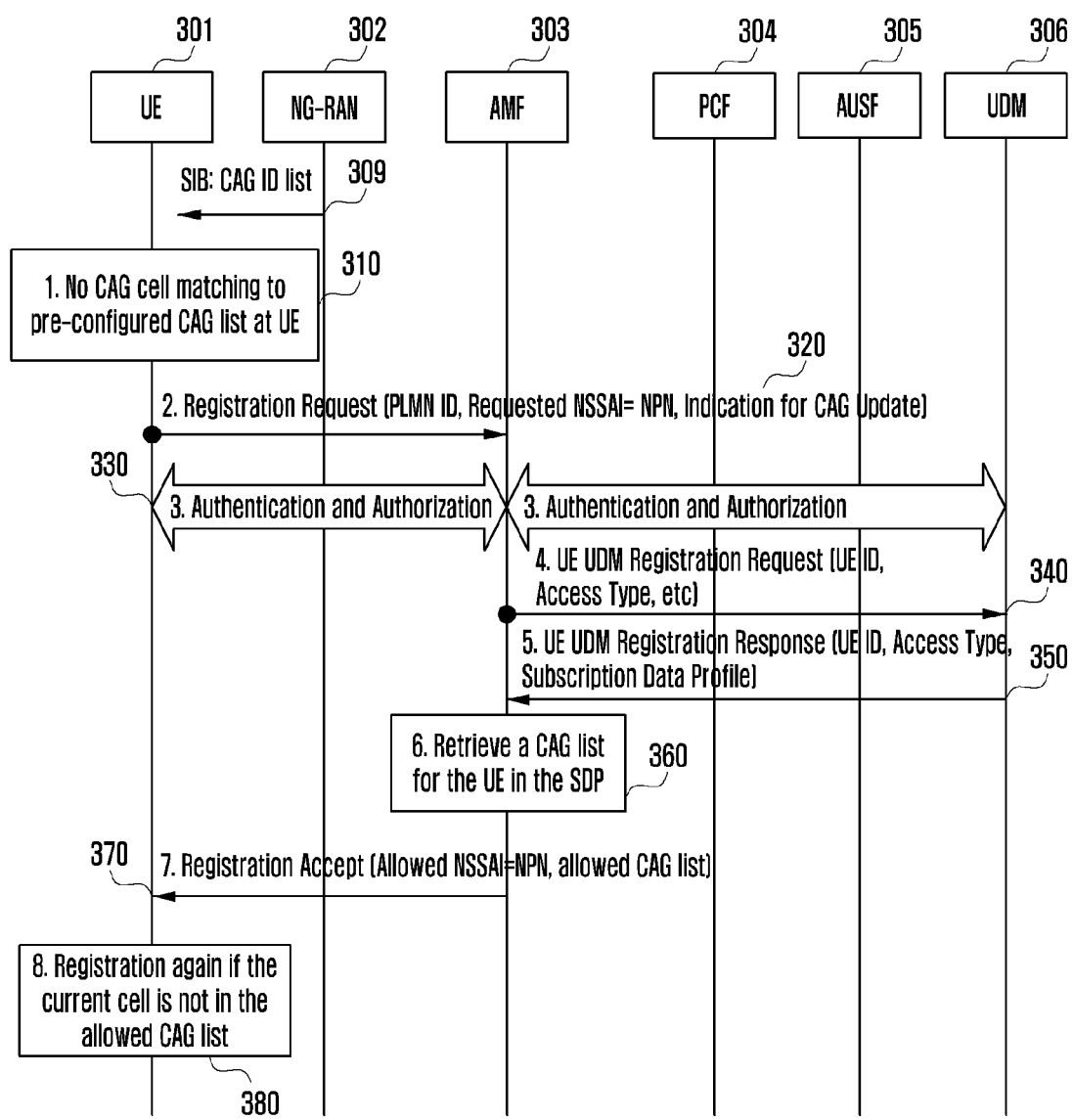
FIG. 3 is a diagram illustrating a process in which an private network UE accesses a private network slice to update configuration information by using a separate indicator according to an embodiment of the disclosure.

FIG. 3 is a diagram illustrating a process in which an private network UE accesses a private network slice to update configuration information by using a separate indicator according to an embodiment of the disclosure.

FIG. 3 describes a detailed procedure for the operation described in relation to FIG. 2. For description of each process with reference to FIG. 3, at step 309, the base station 302 supporting private network access may periodically broadcast, through a cell that allows private network access, a radio signal including a system information block (SIB) containing a CAG ID list supported by the cell.

At step 310, the UE 301 may receive CAG ID list information included in the SIB and identify whether a CAG ID usable for its private network access is included in the received CAG ID list information.

Here, the UE 301 may determine that a CAG ID it can access is not included in the CAG ID list received from the base station 302. Then, the UE 301 may be instructed by the user or a configuration program to update configuration information for private network access. According to an embodiment, when the UE 301 performs such an operation, although the UE 301 does not have a CAG ID set for its own use in the CAG ID list information received from the base station 302, it may continue to perform the initial access and registration process through the currently selected cell regardless of whether a CAG ID usable by the UE 301 is included in the CAG ID list received from the base station 302. In this case, steps 309 to 310 may be skipped.

According to an embodiment, it is also possible to separately implement a CAG update mode in the UE 301, and when the UE 301 performs the operation of updating configuration information for a private network, it is possible to skip the operation of step 310 for identifying whether a CAG ID usable by the UE 301 is included in the CAG ID list received from the base station 302.

According to an embodiment, although it is determined that a CAG ID the UE 301 can access is included in the received CAG ID list, in case that the UE 301 performs an operation for updating configuration information for a private network, the following operation may be performed.

At step 320, the UE 301 in the initial access and registration process may transmit the AMF 303 a registration request message, which includes information indicating that the UE 301 is performing initial registration to update private network configuration information, for example, a parameter "indication for CAG update". Additionally, according to an embodiment, the above message may further include at least one of a public land mobile network (PLMN) identifier (ID) or requested network slice selection assistance information (requested NSSAI). Further, the requested NSSAI may be set to NPN. Further, according to an embodiment, the above message may include a CAG ID. Here, the CAG ID may be a CAG ID the UE has tried to access, a CAG ID preset (e.g., designated by default) to be used when there is no CAG ID the UE can access, or a CAG ID set at the discretion of the UE.

At step 330, the AMF 303 having received the registration request from the UE 301 may perform an authentication process with the UE 301 (and the PCF 304 and the AUSF 305) for initial registration of the UE 301. The above UE authentication may be not performed according to an embodiment.

When the authentication of the UE 301 is successfully completed at step 330, at step 340, the AMF 303 may transmit a UE UDM registration request message for registering the UE 301 to the UDM 306. According to an embodiment, the above message transmitted by the AMF 303 to the UDM 306 may include information indicating that the UE 301 is performing initial network registration to update private network configuration information, for example, a parameter "indication for CAG update". According to an embodiment, the above message may further include at least one of access type information or UE ID.

When the registration of the UE 301 is successfully completed with the UDM 306, at step 350, the AMF 303 may receive a subscription data profile (SDP) including subscription information of the UE 301 through a UE UDM registration response message from the UDM 506. According to an embodiment, the above message may further include at least one of access type information or UE ID.

At step 360, the AMF 303 may identify CAG list information the UE 301 is allowed to use for private network access, included in the subscription data profile.

At step 370, the AMF 303 may transmit a registration accept message including updated CAG list information to the UE 301. According to an embodiment, the above message may further include allowed NSSAI. Also, the allowed NSSAI may be set to NPN.

At step 380, the UE 301 may identify the updated CAG list information from the received registration accept message and store it for use in a future access process.

According to an embodiment, from the updated CAG list information, the UE 301 may identify whether the CAG ID included in the CAG list received from the cell of the base station 302 through which it has performed the initial access and registration process is included in the updated CAG list information of the UE 301. Then, if the CAG ID included in the CAG list received from the cell of the base station 302 is not included in the updated CAG list information of the UE 301, the UE 301 may cancel the current registration, search for a cell of a base station providing a CAG ID included in the updated CAG list, and perform the initial access and registration process again.

Through the above operation proposed in the disclosure, the private network UE can configure or update private network configuration information for access to a private network, and use it to utilize the private network through a designated cell.

Figure 4:
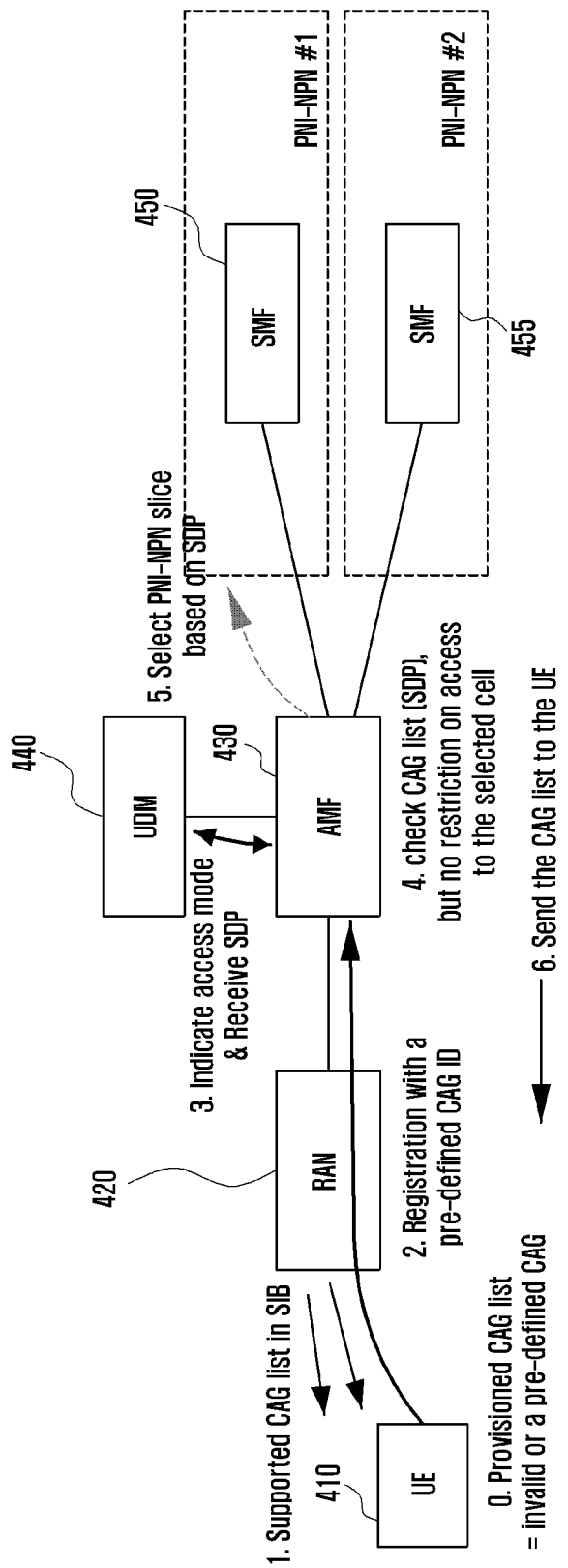
FIG. 4 illustrates overall operations of an private network UE to update configuration information by using a closed access group (CAG) ID preconfigured for the purpose of updating configuration information according to an embodiment of the disclosure.

FIG. 4 illustrates overall operations of an private network UE to update configuration information by using a closed access group (CAG) ID preconfigured for the purpose of updating configuration information according to an embodiment of the disclosure.

With reference to FIG. 4, the UE 410 may be in a state in which access to the private network is suspended. For example, although the base station 440 has transmitted CAG IDs through the SIB, there may be no accessible CAG cell matching the CAG list stored in the UE 410, or there may be no valid CAG list in the UE 410. In this case, by the user or an operation of a separate configuration program, the UE 410 may initiate network access to update configuration information for private network connection.

When the UE 410 executes an access procedure for updating private network configuration information, unlike a regular private network access process, the UE 410 may perform an initial access procedure by using a CAG ID designated in advance in the system.

The CAG ID designated for updating private network configuration information may be broadcast from a cell of the base station 420 by being included in CAG ID list information in the SIB together with regular CAG IDs. According to an embodiment, CAG update mode may be separately implemented in the UE 410. In this case, the UE 410 may skip the operation of identifying whether a CAG ID the UE 410 can use is included in the CAG ID list received from the base station 420. Further, according to an embodiment, the CAG ID designated for updating private network configuration information may be pre-configured in the UE 410. Alternatively, the UE 410 may receive separate configuration information including a CAG ID designated for updating private network configuration information from the base station 420.

The UE 410 may transmit a message including the designated CAG ID information, for example, a registration request message, to the AMF 430 for initial registration.

Then, the AMF 430 having received the registration request message may obtain subscription information of the UE 410 from the UDM 440 storing subscriber information. The AMF 430 may identify private network configuration information of the UE 410 included in the subscription information, and may determine whether to allow the UE 410 to access the private network and whether the private network configuration information needs to be updated. When the UE 410 has transmitted a registration request including the CAG ID designated for updating private network configuration information to the AMF 430, and the subscription information of the UE 410 allows private network access, the AMF 430 may transmit a registration accept message including a CAG ID list as updated private network configuration information to the UE 410.

According to an embodiment, if the updated configuration information of the UE 410 allows access through the cell to which an access attempt is being made, during a process of handling the initial registration of the UE 410, the AMF 430 may additionally perform a process of configuring network resources so as to permit access to a private network slice (e.g., PIN-NPN #1, SMF 450) allowed by the subscription information of the UE 410.

According to an embodiment, the UE 410 may identify whether the current cell is a cell allowed for private network access from the updated configuration information. Then, if the current cell is not a cell allowed for access, the UE 410 may use the updated configuration information received from the AMF 430 to search for a new cell supporting the CAG ID to which access is allowed, and perform the initial registration process again through the corresponding cell.

Figure 5:
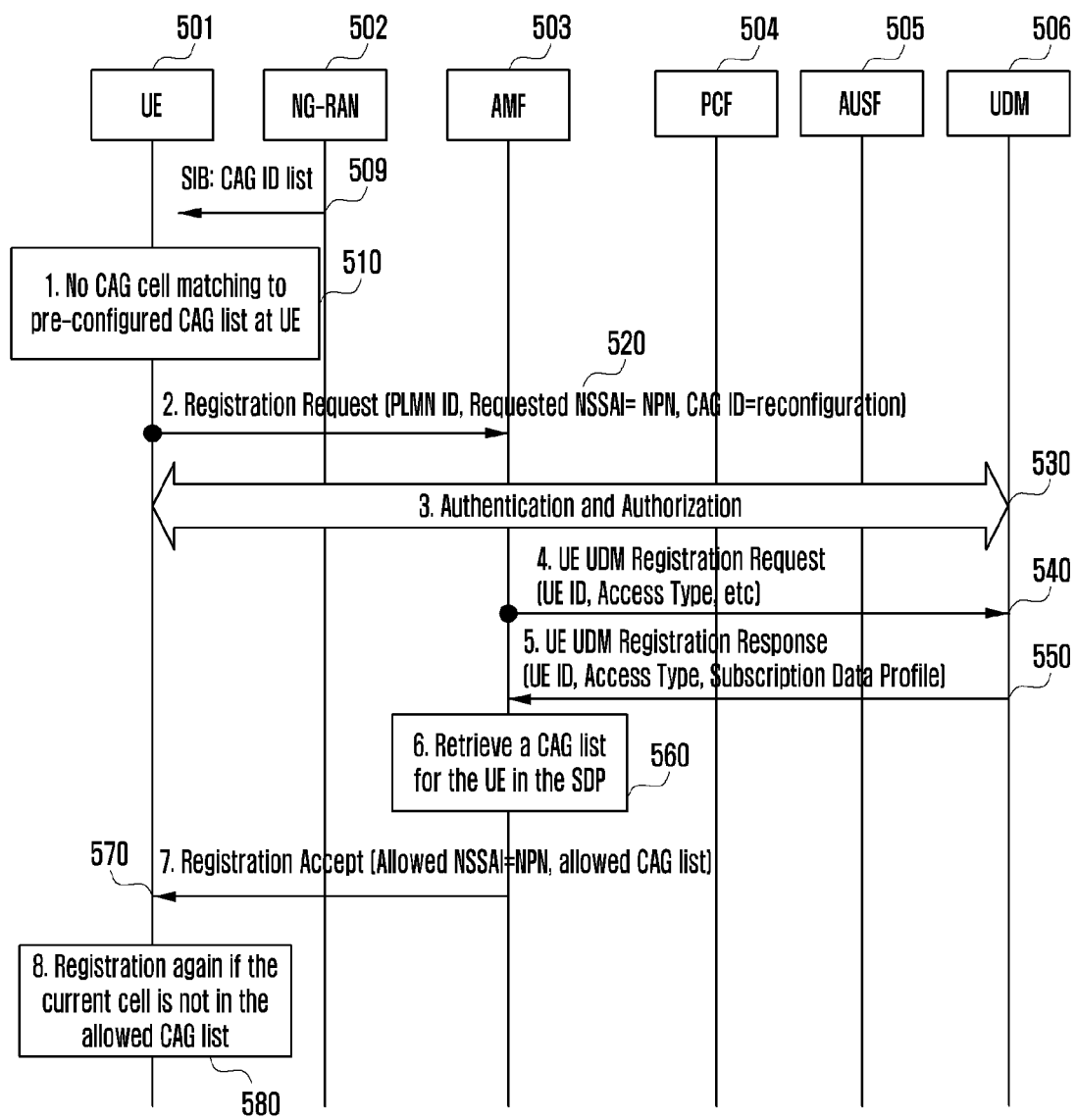
FIG. 5 is a diagram illustrating a process in which an private network UE accesses a private network slice to update configuration information by using a closed access group (CAG) ID preconfigured for the purpose of updating configuration information according to an embodiment of the disclosure.

FIG. 5 is a diagram illustrating a process in which an private network UE accesses a private network slice to update configuration information by using a closed access group (CAG) ID preconfigured for the purpose of updating configuration information according to an embodiment of the disclosure.

FIG. 5 describes a detailed procedure for the operation described in relation to FIG. 4. For description of each process with reference to FIG. 5, at step 509, the base station 502 supporting private network access may periodically broadcast, through a cell that allows private network access, a radio signal including a system information block (SIB) containing a CAG ID list supported by the cell.

At step 510, the UE 501 may receive CAG ID list information included in the SIB and identify whether a CAG ID usable for its private network access is included in the received CAG ID list information.

Here, the UE 501 may determine that a CAG ID it can access is not included in the CAG ID list received from the base station 502. Then, the UE 501 may be instructed by the user or a configuration program to update configuration information for private network access. According to an embodiment, when the UE 501 performs such an operation, although the UE 501 does not have a CAG ID set for its own use in the CAG ID list information received from the base station 502, it may continue to perform the initial access and registration process through the currently selected cell by using a CAG ID pre-specified for updating private network configuration information regardless of whether a CAG ID usable by the UE 501 is included in the CAG ID list received from the base station 502. In this case, steps 509 to 510 may be skipped.

According to an embodiment, it is also possible to separately implement a CAG update mode in the UE 501, and when the UE 501 performs the operation of updating configuration information for a private network, it is possible to skip the operation of step 510 for identifying whether a CAG ID usable by the UE 501 is included in the CAG ID list received from the base station 502.

In another embodiment, the CAG ID designated for private network configuration may be delivered to the UE 501 by being included in CAG ID list information in the SIB broadcast by the base station 502. Upon receiving this, when the CAG ID list information does not include CAG IDs the UE 501 can use for private network access other than the CAG ID designated in advance for updating the private network configuration information, the UE 501 may perform an initial access and registration procedure by using the CAG ID designated for updating private network information.

According to an embodiment, the CAG ID designated for private network configuration may be pre-configured in the UE 501. Alternatively, the UE 501 may receive separate configuration information including the CAG ID designated for updating private network configuration information from the base station 502.

According to an embodiment, although it is determined that a CAG ID the UE 501 can access is included in the received CAG ID list, in case that the UE 501 performs an operation for updating configuration information for a private network, the following operation may be performed.

At step 520, for initial access and registration, the UE 501 may transmit the AMF 503 a registration request message including a pre-configured CAG ID indicating that the UE 501 is performing initial registration to update private network configuration information. For example, the pre-configured CAG ID may be a parameter set to reconfiguration "CAG ID=reconfiguration" to indicate that initial registration is being performed for updating private network configuration information. In addition, the above message may further include at least one of a PLMN ID and requested NSSAI according to an embodiment. Further, the requested NSSAI may be set to NPN. According to an embodiment, as described in relation to FIGS. 2 and 3, the above message may further include information for indicating that the UE 501 is performing initial registration to update private network configuration information, for example, a parameter "indication for CAG update".

At step 530, the AMF 503 having received the registration request from the UE 501 may perform an authentication process with the UE 501 (and the PCF 504 and the AUSF 505) for initial registration of the UE 501. The above UE authentication may be not performed according to an embodiment.

When the authentication of the UE 501 is successfully completed at step 530, at step 540, the AMF 503 may transmit a UE UDM registration request message for registering the UE 501 to the UDM 506. According to an embodiment, the AMF 503 may transmit the UDM 506 the above message including information indicating that the UE 501 is performing initial network registration to update private network configuration information, for example, a parameter "indication for CAG update". According to an embodiment, the above message may further include at least one of access type information or UE ID.

When the registration of the UE 501 is successfully completed with the UDM 506, at step 550, the AMF 503 may receive a subscription data profile (SDP) including subscription information of the UE 501 through a UE UDM registration response message from the UDM 506. According to an embodiment, the above message may further include at least one of access type information or UE ID.

At step 560, the AMF 503 may identify CAG list information the UE 501 is allowed to use for private network access, included in the subscription data profile.

At step 570, the AMF 503 may transmit a registration accept message including updated CAG list information to the UE 501. According to an embodiment, the above message may further include allowed NSSAI. Also, the allowed NSSAI may be set to NPN.

At step 580, the UE 501 may identify the updated CAG list information from the received registration accept message and store it for use in a future access process.

According to an embodiment, from the updated CAG list information, the UE 501 may identify whether the CAG ID included in the CAG list received from the cell of the base station 502 through which it has performed the initial access and registration process is included in the updated CAG list information of the UE 501. Then, if the CAG ID included in the CAG list received from the cell of the base station 502 is not included in the updated CAG list information of the UE 501, the UE 501 may cancel the current registration, search for a cell of a base station providing a CAG ID included in the updated CAG list, and perform the initial access and registration process again.

Through the above operation proposed in the disclosure, the private network UE can configure or update private network configuration information for access to a private network, and use it to utilize the private network through a designated cell.

Figure 6A:
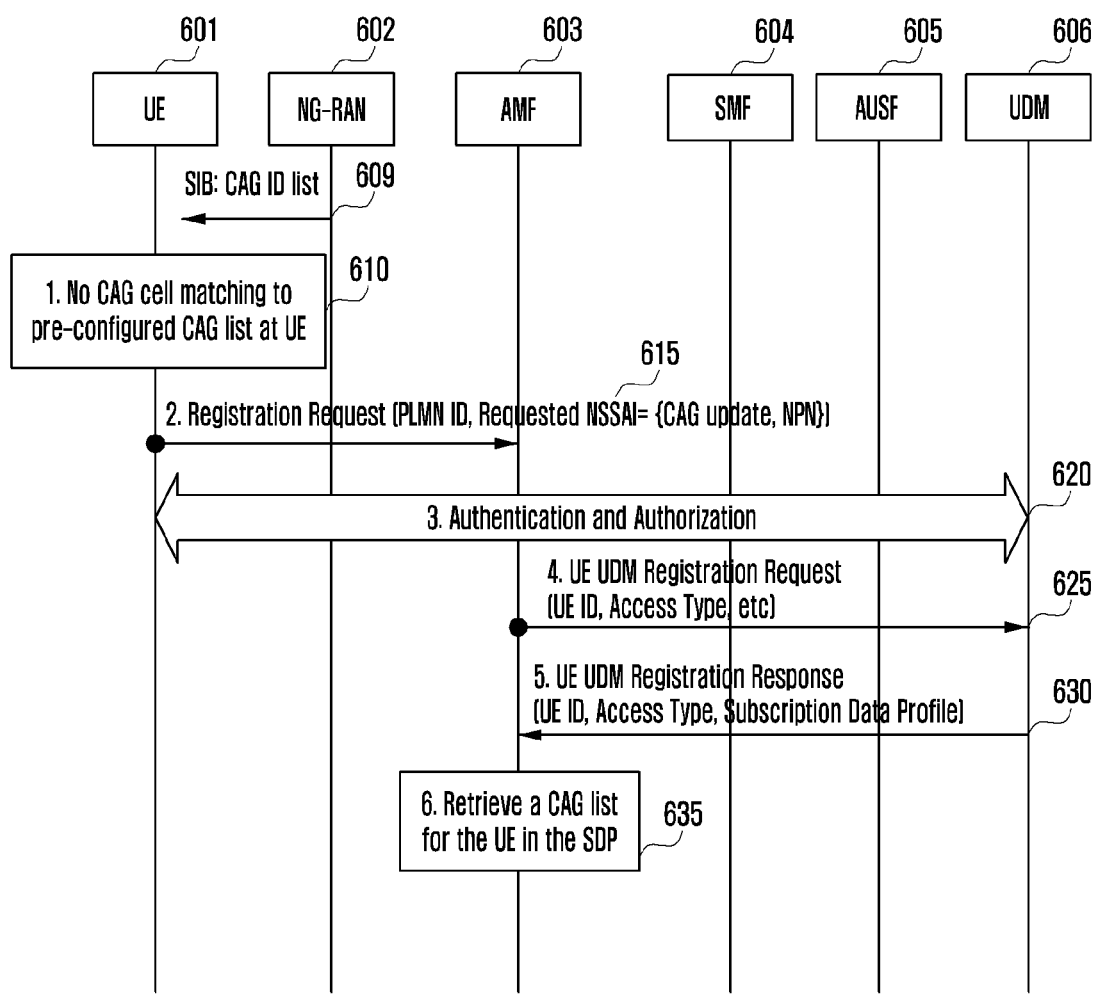
FIGS. 6A and 6B illustrate a process in which an private network UE accesses a corresponding network slice to update configuration information through a network slice pre-specified for the purpose of updating configuration information according to an embodiment of the disclosure.
Figure 6B:
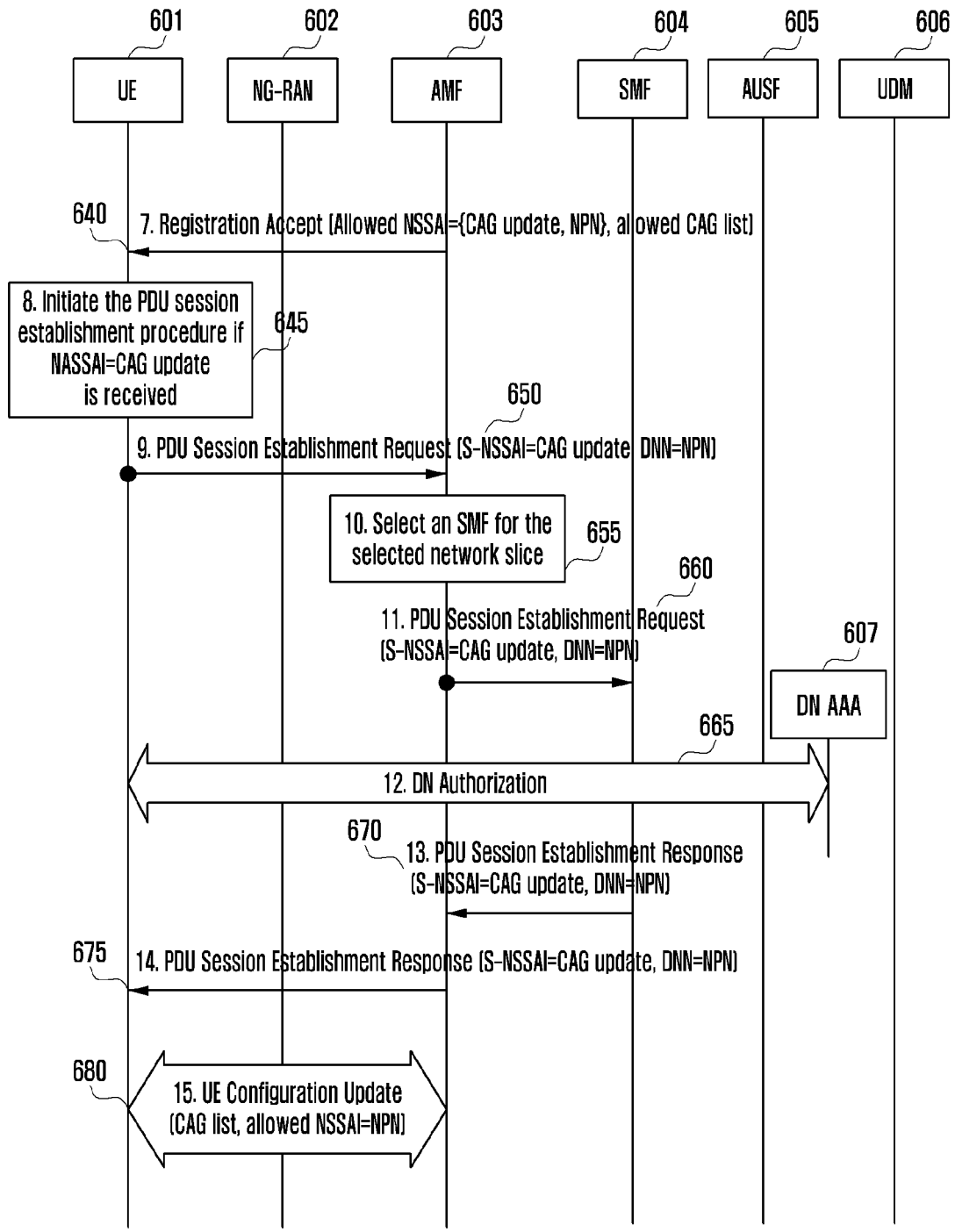

FIGS. 6A and 6B illustrate a process in which an private network UE accesses a corresponding network slice to update configuration information through a network slice pre-specified for the purpose of updating configuration information according to an embodiment of the disclosure.

For description of each process with reference to FIGS. 6A and 6B, at step 609, the base station 602 supporting private network access may periodically broadcast, through a cell that allows private network access, a radio signal including a system information block (SIB) containing a CAG ID list supported by the cell.

At step 610, the UE 601 may receive CAG ID list information included in the SIB and identify whether a CAG ID usable for its private network access is included in the received CAG ID list information.

Here, the UE 601 may determine that a CAG ID it can access is not included in the CAG ID list received from the base station 602. Then, the UE 601 may be instructed by the user or a configuration program to update configuration information for private network access. According to an embodiment, when the UE 601 performs such an operation, although the UE 601 does not have a CAG ID set for its own use in the CAG ID list information received from the base station 602, it may continue to perform the initial access and registration process through a currently selected cell regardless of whether a CAG ID usable by the UE 601 is included in the CAG ID list received from the base station 602. In this case, steps 609 to 610 may be skipped.

According to an embodiment, it is also possible to separately implement a CAG update mode in the UE 601, and when the UE 601 performs the operation of updating configuration information for a private network, it is possible to skip the operation of step 610 for identifying whether a CAG ID usable by the UE 601 is included in the CAG ID list received from the base station 602.

At step 615, the UE 601 in the initial access and registration process may transmit the AMF 603 a registration request message, which includes a parameter "requested network slice selection assistance information (requested NSSAI)" set to a value corresponding to the slice for CAG update to indicate accessing a network slice pre-designated for updating private network configuration information. According to an embodiment, the value of the parameter "requested NSSAI" included in the above message may be further set to NPN. In addition, the above message may further include a PLMN ID according to an embodiment. According to an embodiment, as described in relation to FIGS. 2 to 4, the above message may further include at least one of information indicating that the UE 501 is performing initial registration to update private network configuration information, for example, a parameter "indication for CAG update" or a CAG ID (e.g., "CAG ID=reconfiguration") pre-configured to indicate that initial registration is in progress to update private network configuration information.

At step 620, the AMF 603 having received the registration request from the UE 601 may perform an authentication process with the UE 601 (and the SMF 604 and PCF (not shown)) for initial registration of the UE 601. The above UE authentication may be not performed according to an embodiment.

When the authentication of the UE 601 is successfully completed at step 620, at step 625, the AMF 603 may transmit a UE UDM registration request message for registering the UE to the UDM 606. According to an embodiment, the AMF 603 may transmit the UDM 606 the above message including information indicating that the UE 601 is performing initial network registration to update private network configuration information, for example, a parameter "indication for CAG update". According to an embodiment, the above message may further include at least one of access type information or UE ID.

When the registration of the UE 601 is successfully completed with the UDM 606, at step 630, the AMF 603 may receive a subscription data profile (SDP) including subscription information of the UE 601 through a UE UDM registration response message from the UDM 606. According to an embodiment, the above message may further include at least one of access type information or UE ID.

At step 635, the AMF 603 may identify CAG list information the UE 601 is allowed to use for private network access, included in the subscription data profile.

At step 640, the AMF 603 may transmit a registration accept message including updated CAG list information to the UE 601. Also, allowed NSSAI information indicating that the currently allowed access is limited to a network slice for the purpose of updating private network configuration information of the UE 601 may be included in the registration accept message and transmitted to the UE 601. Further, when it is determined that separate communication with a private network management server is necessary to update private network configuration information of the UE 601, the AMF 603 may add information indicating that additional authentication is required to the registration accept message and transmit it to the UE 601.

When the UE 601 receives a registration accept message including information indicating that additional communication with a private network management server is required to update private network configuration information through the current access at step 640, at step 645, the UE 601 may initiate a protocol data unit (PDU) session establishment procedure for communication with the private network management server.

At step 650, the UE 601 may transmit a request message for establishing a PDU session to the AMF 603. According to an embodiment, the request message may be a PDU session establishment request message. According to an embodiment, the request message may include at least one of S-NSSAI information or data network name (DNN) information. The S-NSSAI parameter may be set to a value for CGA update, and DNN may be set to NPN.

At step 655, the AMF 603 may perform a process of selecting an appropriate SMF 604 in the network slice designated for updating private network configuration information.

At step 660, the AMF 603 may deliver the information of the request message for PDU session establishment received from the UE 601 to the SMF 604 selected at step 655. The above message may include at least one of S-NSSAI information or DNN information. The S-NSSAI parameter may be set to a value for CGA update, and DNN may be set to NPN.

At step 665, upon determining that additional access to the private network management server is needed based on the information that the S-NSSAI, which is network slice information included in the PDU session establishment request message received from the AMF 603, is set to CAG update (or, it is also possible to utilize the information that the DNN information indicating a network to be accessed is set to NPN indicating a private network as an additional basis for determination), the SMF 604 may perform additional authentication with the DN AAA 607 being a private network management server to establish a communication path between the UE 601 and the private network management server.

At step 670, the SMF 604 may transmit the AMF 603 a PDU session establishment response message for notifying the UE 601 that PDU session establishment requested by the UE 601 for updating private network configuration information has been successfully completed.

At step 675, the AMF 603 may confirm that PDU session establishment requested by the UE 601 is successful based on the PDU session establishment response message received from the SMF 604, and may deliver the message received from the SMF 604 to the UE 601. The above message may include at least one of S-NSSAI information or DNN information according to an embodiment. The S-NSSAI parameter may be set to a value for CGA update, and DNN may be set to NPN.

Upon confirming that the UE 601 has completed the PDU session with the private network management server at step 675, at step 680, the AMF 603 may transmit a UE configuration update message including the updated private network configuration information to the UE 601 to update the private network configuration information of the UE 601.

The UE 601 may store CAG list information being private network configuration information included in the UE configuration update message, identify the updated CAG list information, and use it in a future access process. In addition, the UE 601 may store the updated CAG list information received at step 640, identify the updated CAG list information, and use it in a future access process.

In addition, the UE 601 may search for a base station and a cell allowed for private network access by using the updated CAG list information, and perform the initial access and registration process again.

Through the above operation proposed in the disclosure, the private network UE can configure or update private network configuration information for access to a private network, and use it to utilize the private network through a designated cell.

Meanwhile, depending on the embodiment, steps 645 to 680 may be applied to the embodiment described with reference to FIGS. 2 to 3 and the embodiment described with reference to FIGS. 4 to 5.

For example, in the embodiment related to FIG. 3, at step 380, the UE 301 may identify updated CAG list information from the received registration accept message and store it for use in a future access process. Here, allowed NSSAI information indicating that the currently allowed access is limited to a network slice for the purpose of updating private network configuration information of the UE 301 may be included in the registration accept message and transmitted to the UE 301. Further, when it is determined that separate communication with the private network management server is needed to update the private network configuration information of the UE 301, the AMF 303 may add information indicating that additional authentication is required to the registration accept message and transmit it to the UE 301.

When the UE 301 receives a registration accept message including information indicating that additional communication with a private network management server is required to update private network configuration information through the current access, the UE 301 may initiate a PDU session establishment procedure for communication with the private network management server. Then, the UE 301 may transmit a request message for establishing a PDU session to the AMF 303. The AMF 303 may perform a process of selecting an appropriate SMF in the network slice designated for updating private network configuration information. The AMF 303 may deliver the information of the request message for PDU session establishment received from the UE 301 to the selected SMF. Then, upon determining that additional access to the private network management server is needed based on the information that the S-NSSAI, which is network slice information included in the PDU session establishment request message received from the AMF 303, is set to CAG update (or, it is also possible to utilize the information that the DNN information indicating a network to be accessed is set to NPN indicating a private network as an additional basis for determination), the SMF 304 may perform additional authentication with the DN AAA being a private network authentication server to establish a communication path between the UE 301 and the private network management server. The SMF may transmit the AMF 303 a PDU session establishment response message for notifying the UE 301 that PDU session establishment requested by the UE 301 for updating private network configuration information has been successfully completed. The AMF 303 may confirm that PDU session establishment requested by the UE 301 is successful based on the PDU session establishment response message received from the SMF, and may forward the message received from the SMF to the UE 301. Upon confirming that the UE 301 has completed the PDU session with the private network management server, the AMF 303 may transmit a UE configuration update message including the updated private network configuration information to the UE 301 to update the private network configuration information of the UE 301. The UE 301 may store CAG list information being private network configuration information included in the UE configuration update message, identify the updated CAG list information, and use it in a future access process.

Or, in the embodiment related to FIG. 5, at step 580, the UE 501 may identify updated CAG list information from the received registration accept message and store it for use in a future access process. Here, allowed NSSAI information indicating that the currently allowed access is limited to a network slice for the purpose of updating private network configuration information of the UE 501 may be included in the registration accept message and transmitted to the UE 501. Further, when it is determined that separate communication with the private network management server is needed to update the private network configuration information of the UE 501, the AMF 503 may add information indicating that additional authentication is required to the registration accept message and transmit it to the UE 501.

When the UE 501 receives a registration accept message including information indicating that additional communication with a private network management server is required to update private network configuration information through the current access, the UE 501 may initiate a PDU session establishment procedure for communication with the private network management server. Then, the UE 501 may transmit a request message for establishing a PDU session to the AMF 503. The AMF 503 may perform a process of selecting an appropriate SMF in the network slice designated for updating private network configuration information. The AMF 503 may deliver the information of the request message for PDU session establishment received from the UE 501 to the selected SMF. Then, upon determining that additional access to the private network management server is needed based on the information that the S-NSSAI, which is network slice information included in the PDU session establishment request message received from the AMF 503, is set to CAG update (or, it is also possible to utilize the information that the DNN information indicating a network to be accessed is set to NPN indicating a private network as an additional basis for determination), the SMF may perform additional authentication with the DN AAA being a private network authentication server to establish a communication path between the UE 501 and the private network management server. The SMF may transmit the AMF 503 a PDU session establishment response message for notifying the UE 501 that PDU session establishment requested by the UE 501 for updating private network configuration information has been successfully completed. The AMF 503 may confirm that PDU session establishment requested by the UE 501 is successful based on the PDU session establishment response message received from the SMF, and may forward the message received from the SMF to the UE 501. Upon confirming that the UE 501 has completed the PDU session with the private network management server, the AMF 503 may transmit a UE configuration update message including the updated private network configuration information to the UE 501 to update the private network configuration information of the UE 501. The UE 501 may store CAG list information being private network configuration information included in the UE configuration update message, identify the updated CAG list information, and use it in a future access process.

Figure 7:
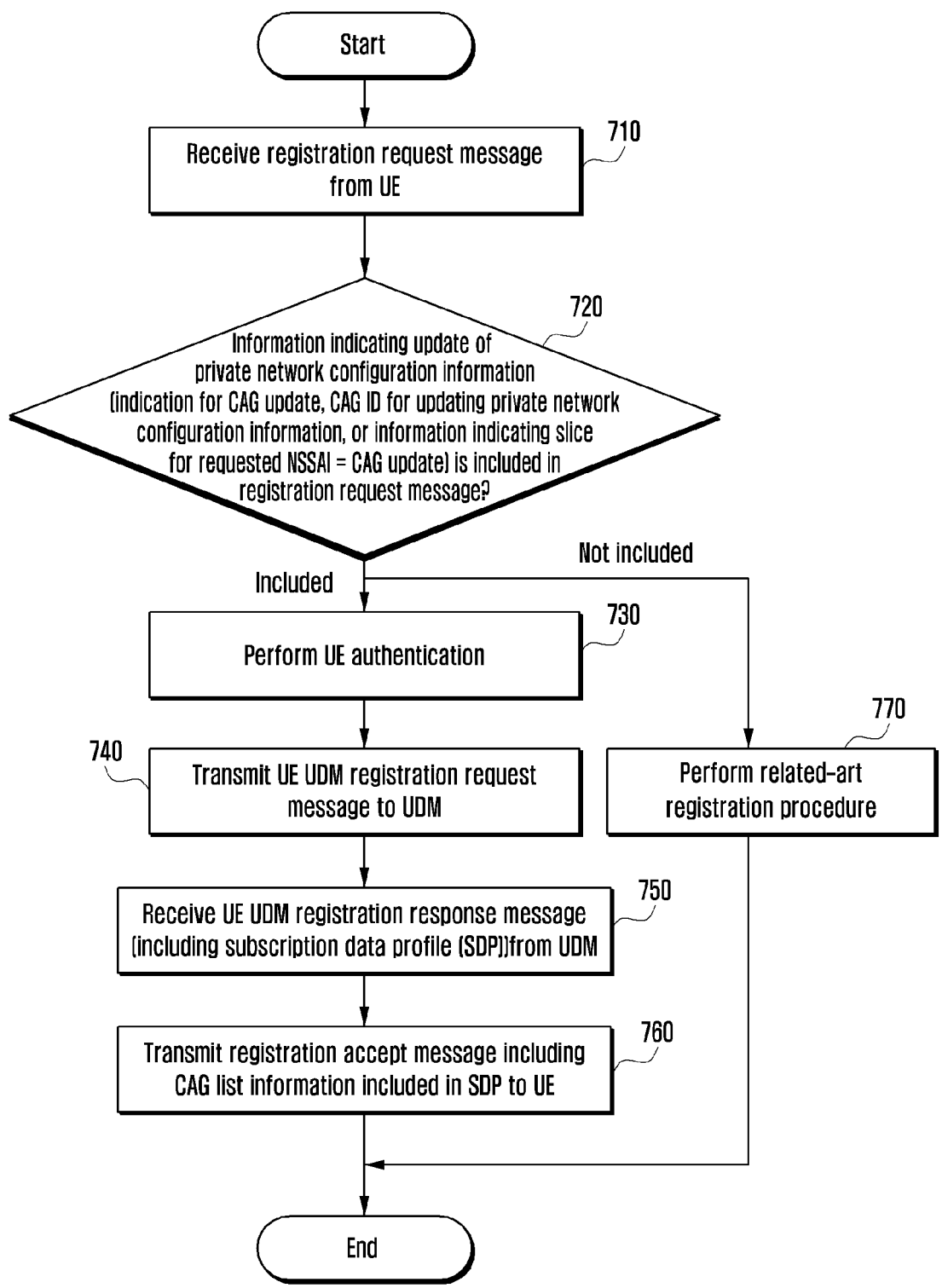
FIG. 7 is a diagram illustrating an example of AMF operations according to an embodiment of the disclosure.

FIG. 7 is a diagram illustrating an example of AMF operations according to an embodiment of the disclosure.

With reference to FIG. 7, at step 710, the AMF may receive a registration request message from a UE.

Then, at step 720, the AMF may identify whether information indicating an update of private network configuration information is included in the registration request message. The information indicating an update of private network configuration information may be, as described in relation to FIGS. 2 to 6B, an indication for CAG update, a CAG ID for updating private network configuration information, or a requested NSSAI value indicating a slice for CAG update.

To this end, although the UE has received a CAG ID list through an SIB from the base station, if a CAG ID the UE can access is not included in the received CAG ID list, the UE may transmit a registration request message. Or, although it is determined that a CAG ID the UE can access is included in the received CAG ID list, the terminal may transmit a registration request message to update private network configuration information. Or, the terminal may transmit a registration request message to update private network configuration information without determining whether a CAG ID the UE can access is included in the CAG ID list received from the base station.

When information indicating an update of private network configuration information is included in the registration request message at step 720, at step 730, the AMF may perform UE authentication. According to an embodiment, the UE authentication may be not performed.

At step 740, the AMF may transmit a UE UDM registration request message for registering the UE to the UDM. Here, the AMF may transmit, to the UDM, information indicating that the UE is currently performing initial network registration for updating private network configuration information by including, for example, a parameter "indication for CAG update" in the above message.

At step 750, when the UE is successfully registered with the UDM, the AMF may receive a subscription data profile (SDP) including subscription information to which the UE has subscribed from the UDM through a UE UDM registration response message.

At step 760, the AMF may identify the CAG list information the UE is allowed to use for private network access, included in the subscription data profile, and may transmit a registration accept message including updated CAG list information to the UE.

Then, upon receiving the registration accept message, the UE may identify the updated CAG list information and store it for use in a future access process, and may perform the initial access and registration process again according to an embodiment.

On the other hand, upon determining that information indicating an update of private network configuration information is not included in the registration request message at step 720, at step 770, the AMF may perform a related-art registration procedure.

According to an embodiment, although not shown, at step 760, when it is determined that separate communication with a private network management server is necessary to update private network configuration information of the UE, the AMF may add information indicating that additional authentication is required to the registration accept message and transmit it to the UE. Then, the AMF may receive a request message for establishing a PDU session from the UE. In return, the AMF may select an appropriate SMF in the network slice designated for updating private network configuration information, and deliver the information of the request message for PDU session establishment received from the UE to the selected SMF. Then, the SMF may perform additional authentication with the DN AAA being a private network authentication server to establish a communication path between the UE and the private network management server. Further, the AMF may receive, from the SMF, a PDU session establishment response message for notifying the UE that PDU session establishment requested by the UE for updating private network configuration information has been successfully completed. The AMF may confirm that PDU session establishment requested by the UE is successful based on the PDU session establishment response message received from the SMF, and may forward the message received from the SMF to the UE. Then, upon confirming that the UE has completed the PDU session with the private network management server, the AMF may transmit a UE configuration update message including the updated private network configuration information to the UE to update the private network configuration information of the UE. As a result, the UE may store CAG list information being private network configuration information included in the UE configuration update message, and may identify the updated CAG list information and store it for use in a future access process.

Figure 8:
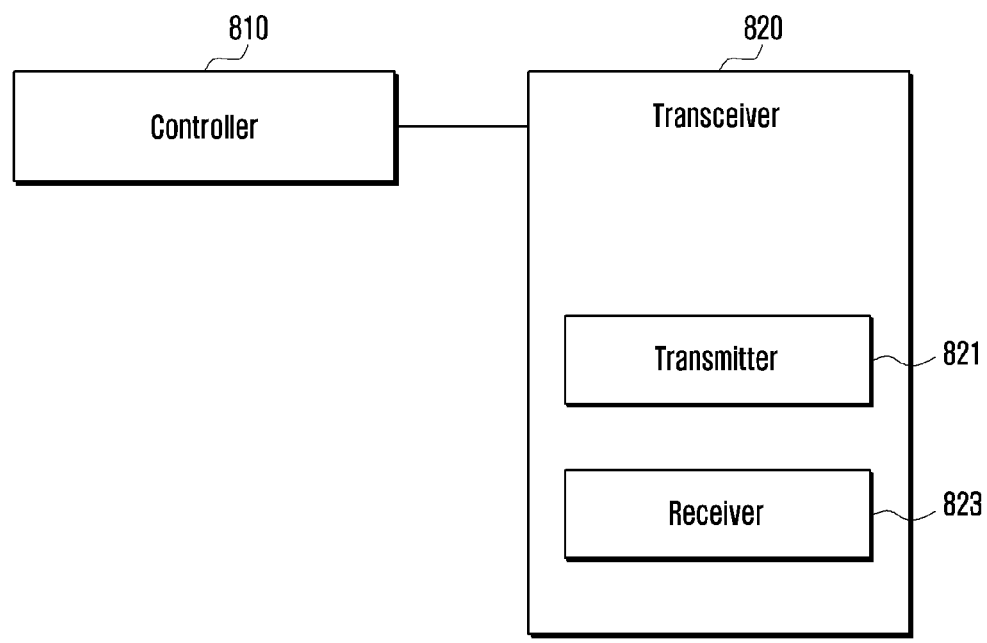
FIG. 8 is a block diagram of a UE according to an embodiment of the disclosure.

FIG. 8 is a block diagram of a UE according to an embodiment of the disclosure.

With reference to FIG. 8, the UE according to an embodiment of the disclosure may include a transceiver 820, and a controller 810 for controlling the overall operation of the UE. Further, the transceiver 820 may include a transmitter 821 and a receiver 823.

The transceiver 820 may transmit and receive signals to and from other network entities.

The controller 810 may control the UE to perform operations according to one of the above-described embodiments. Meanwhile, the controller 810 and the transceiver 820 do not necessarily have to be implemented as separate modules, but may be implemented as a single module like a single chip. The controller 810 and the transceiver 820 may be electrically connected. For example, the controller 810 may be a circuit, an application-specific circuit, or at least one processor. In addition, the operations of the UE can be realized by providing a memory storing the corresponding program codes in a specific component of the UE.

Figure 9:
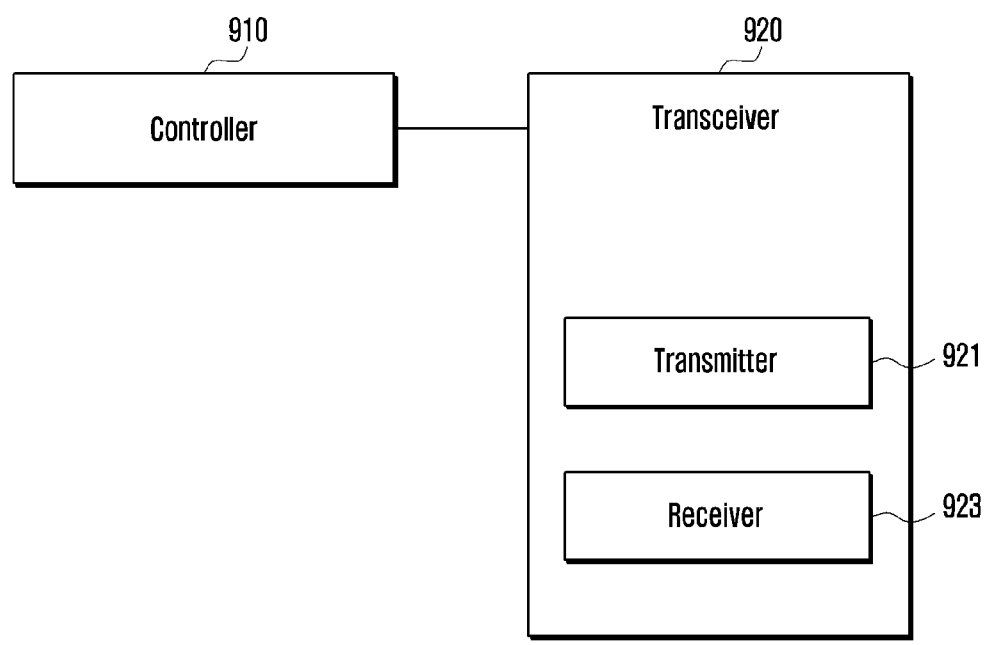
FIG. 9 is a block diagram of a network entity according to the disclosure.

FIG. 9 is a block diagram of a network entity according to an embodiment of the disclosure.

The network entity of the disclosure is a concept including a network function according to system implementation.

With reference to FIG. 9, the network entity according to an embodiment of the disclosure may include a transceiver 920, and a controller 910 for controlling the overall operation of the network entity. Further, the transceiver 920 may include a transmitter 921 and a receiver 923.

The transceiver 920 can transmit and receive signals to and from other network entities.

The controller 910 may control the network entity to perform operations according to one of the above-described embodiments. Meanwhile, the controller 910 and the transceiver 920 do not necessarily have to be implemented as separate modules, but may be implemented as a single module like a single chip. In addition, the controller 910 and the transceiver 920 may be electrically connected. For example, the controller 910 may be a circuit, an application-specific circuit, or at least one processor. Further, the operations of the network entity can be realized by providing a memory storing the corresponding program codes in a specific component of the network entity.

The network entity may be one of base station (RAN, NG-RAN, eNB, gNB, NB), AMF, SMF, PCF, UDM, AUSF, DN AAA, and private network management server.

It should be noted that structure diagrams, diagrams illustrating a control/data signal transmission method, operational procedures, and block diagrams depicted in FIGS. 1 to 9 are not intended to limit the scope of the disclosure. In other words, all the components, entities, or operations described above in FIGS. 1 to 9 should not be construed as being essential for the practice of the disclosure, and some of them may be sufficient to practice the disclosure without departing from the spirit of the disclosure.

The above-described operations of the base station or terminal can be realized by providing a memory storing the corresponding program codes in a specific component of the base station or terminal. That is, the controller of the base station or terminal can perform the above-described operations by causing a processor or CPU (central processing unit) to read and execute the program codes stored in the memory.

The various components and modules of the entity, base station or terminal described in this specification may be operated by using hardware such as a complementary-metal-oxide-semiconductor based logic circuit, firmware, software, or software embedded in a machine readable medium, or a combination thereof. For example, various electrical structures and methods may be realized by using electrical circuits such as transistors, logic gates, or application specific integrated circuits.

In the above-described embodiments of the disclosure, the elements included in the disclosure are expressed in a singular or plural form according to the proposed specific embodiment. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Meanwhile, the embodiments of the disclosure disclosed in the present specification and drawings are only presented as specific examples to easily explain the technical contents of the disclosure and help the understanding of the disclosure, and are not intended to limit the scope of the disclosure. That is, it will be apparent to those of ordinary skill in the art to which the disclosure pertains that other modifications may be implemented based on the technical spirit of the disclosure. In addition, each of the above embodiments may be operated in combination with each other as needed. For example, parts of one embodiment and another embodiment of the disclosure may be combined to operate a base station and a terminal. In addition, the embodiments of the disclosure are applicable to other communication systems, and other modifications based on the technical spirit of the embodiments may also be carried out.

The invention claimed is:

1. A method performed by a terminal in a wireless communication system, the method comprising:
  receiving, from an access and mobility management function (AMF), system information including a list of closed access group (CAG) identifiers (IDs);
  identifying whether a CAG ID that the terminal is allowed to access is included in the list of the CAG IDs;
  in case that the CAG ID that the terminal is allowed to access is not included in the list of the CAG IDs, transmitting, to the AMF, a registration request message including information indicating an update of private network configuration information; and
  receiving, from the AMF, a registration accept message including the private network configuration information.

2. The method of claim 1, wherein the information indicating the update of the private network configuration information includes at least one of an indication for closed access group (CAG) update, a CAG identifier (ID) preset for updating the private network configuration information, or information indicating a slice for updating the private network configuration information.

3. The method of claim 1, further comprising:
  in case that information indicating that additional authentication is required is included in the registration accept message, transmitting, to the AMF, a request message for establishing a protocol data unit (PDU) session;
  receiving, from the AMF, a response message including information indicating that PDU session establishment is successful; and
  receiving, from the AMF, a UE configuration update message including the private network configuration information.

4. A method performed by an access and mobility management function (AMF) in a wireless communication system, the method comprising:

transmitting, to a terminal, system information including a list of closed access group (CAG) identifiers (IDs);
in case that a CAG ID that the terminal is allowed to access is not included in the list of the CAG IDs, receiving, from a terminal, a registration request message including information indicating an update of private network configuration information of the terminal;
transmitting, to a user data management (UDM), a registration request message for registering the terminal;
receiving, from the UDM, a subscription data profile (SDP) including the private network configuration information of the terminal; and
transmitting, to the terminal, a registration accept message including the private network configuration information.

5. The method of claim 4, wherein the information indicating the update of the private network configuration information includes at least one of an indication for closed access group (CAG) update, a CAG identifier (ID) preset for updating the private network configuration information, or information indicating a slice for updating the private network configuration information.

6. The method of claim 4, further comprising:
in case that information indicating that additional authentication is required is included in the registration accept message, receiving, from the terminal, a request message for establishing a protocol data unit (PDU) session;
transmitting, to a session management function (SMF) for updating the private network configuration information of the terminal, the request message for PDU session establishment;
receiving, from the SMF, a response message for PDU session establishment in case that authentication with a private network management server is successful;
transmitting, to the terminal, a response message including information indicating that PDU session establishment is successful; and
transmitting, to the terminal, a UE configuration update message including the private network configuration information.

7. A terminal in a wireless communication system, comprising:
a transceiver; and
a controller is configured to:
receive, from an access and mobility management function (AMF) via the transceiver, system information including a list of closed access group (CAG) identifiers (IDs),
identify whether a CAG ID that the terminal is allowed to access is included in the list of the CAG IDs,
in case that the CAG ID that the terminal is allowed to access is not included in the list of the CAG IDs, transmit, to the AMF, a registration request message including information indicating an update of private network configuration information through the transceiver, and
receive a registration accept message including the private network configuration information through the transceiver from the AMF.

8. The terminal of claim 7, wherein the information indicating the update of the private network configuration information includes at least one of an indication for closed access group (CAG) update, a CAG identifier (ID) preset for updating the private network configuration information, or information indicating a slice for updating the private network configuration information.

9. The terminal of claim 7, wherein the controller is configured to:
in case that information indicating that additional authentication is required is included in the registration accept message, transmit, to the AMF via the transceiver, a request message for establishing a protocol data unit (PDU) session,
receive, from the AMF via the transceiver, a response message including information indicating that PDU session establishment is successful, and
receive, from the AMF via the transceiver, a UE configuration update message including the private network configuration information.

10. An access and mobility management function (AMF) in a wireless communication system, comprising:
a transceiver; and
a controller configured to:
transmit, to a terminal, system information including a list of closed access group (CAG) identifiers (IDs),
in case that a CAG ID that the terminal is allowed to access is not included in the list of the CAG IDs, receive, from a terminal via the transceiver, a registration request message including information indicating an update of private network configuration information of the terminal,
transmit, to a user data management (UDM) via the transceiver, a registration request message for registering the terminal,
receive, from the UDM via the transceiver, a subscription data profile (SDP) including the private network configuration information of the terminal, and
transmit, to the terminal via the transceiver, a registration accept message including the private network configuration information.

11. The AMF of claim 10, wherein the information indicating the update of the private network configuration information includes at least one of an indication for closed access group (CAG) update, a CAG identifier (ID) preset for updating the private network configuration information, or information indicating a slice for updating the private network configuration information.

12. The AMF of claim 10, wherein the controller is configured to:
in case that information indicating that additional authentication is required is included in the registration accept message, receive, from the terminal via the transceiver, a request message for establishing a protocol data unit (PDU) session,
transmit, to a session management function (SMF) for updating the private network configuration information of the terminal via the transceiver, the request message for PDU session establishment,
receive, from the SMF via the transceiver, a response message for PDU session establishment, in case that authentication with a private network management server is successful,
transmit, to the terminal via the transceiver, a response message including information indicating that PDU session establishment is successful, and
transmit, to the terminal via the transceiver, a UE configuration update message including the private network configuration information.

* * * * *